United States Patent

Holbert et al.

[19]

[11] Patent Number: 5,984,301
[45] Date of Patent: Nov. 16, 1999

[54] POSITION ADJUSTMENT CONVEYOR

[75] Inventors: John C. Holbert; Forrest Stauss, both of Corvallis, Oreg.

[73] Assignee: Carruthers Equipment Co., Warrenton, Oreg.

[21] Appl. No.: 08/801,264

[22] Filed: Feb. 19, 1997

[51] Int. Cl.⁶ .............................. B65H 7/02; B65G 47/24
[52] U.S. Cl. .................... 271/227; 271/236; 271/250; 198/456; 198/434; 198/395
[58] Field of Search ...................................... 271/227, 236, 271/250, 197; 198/456, 434, 395

[56] References Cited

U.S. PATENT DOCUMENTS 5,141,112  8/1992  Holbert .
5,564,892  10/1996  Holbert .

Primary Examiner—Johnny D. Cherry
Assistant Examiner—Steven B. McAllister
Attorney, Agent, or Firm—Robert L. Harrington

[57] ABSTRACT

A positioning conveyor is incorporated in a conveyor system for adjusting the position of a sheet on the conveyor system. The positioning conveyor has two belt type conveyor sections that are independently movable transverse to the feed path and are utilized to adjust the position of the sheet. The sheet is scanned by a scanner and the data is input to a computer. A vacuum zone on each section provides spaced apart gripping points to establish a pivot axis to correct for skew. The computer controls the coordinated movement of the sections to pivot and side shift the sheet to a desired position.

5 Claims, 4 Drawing Sheets

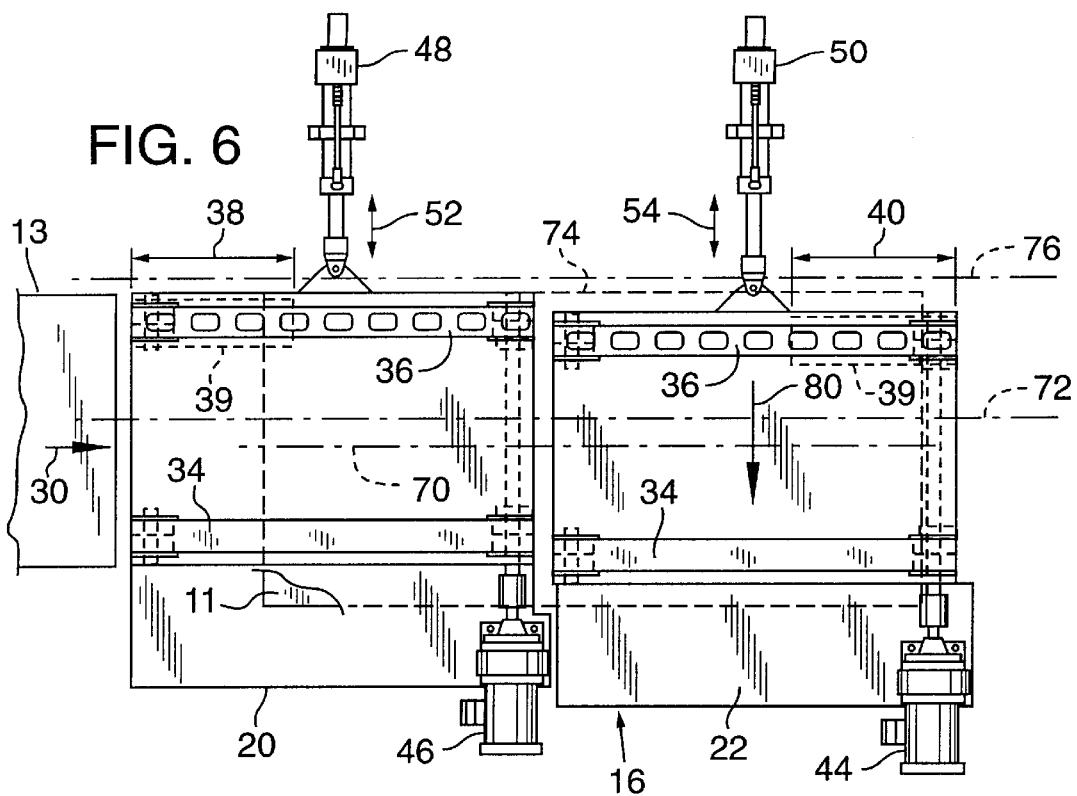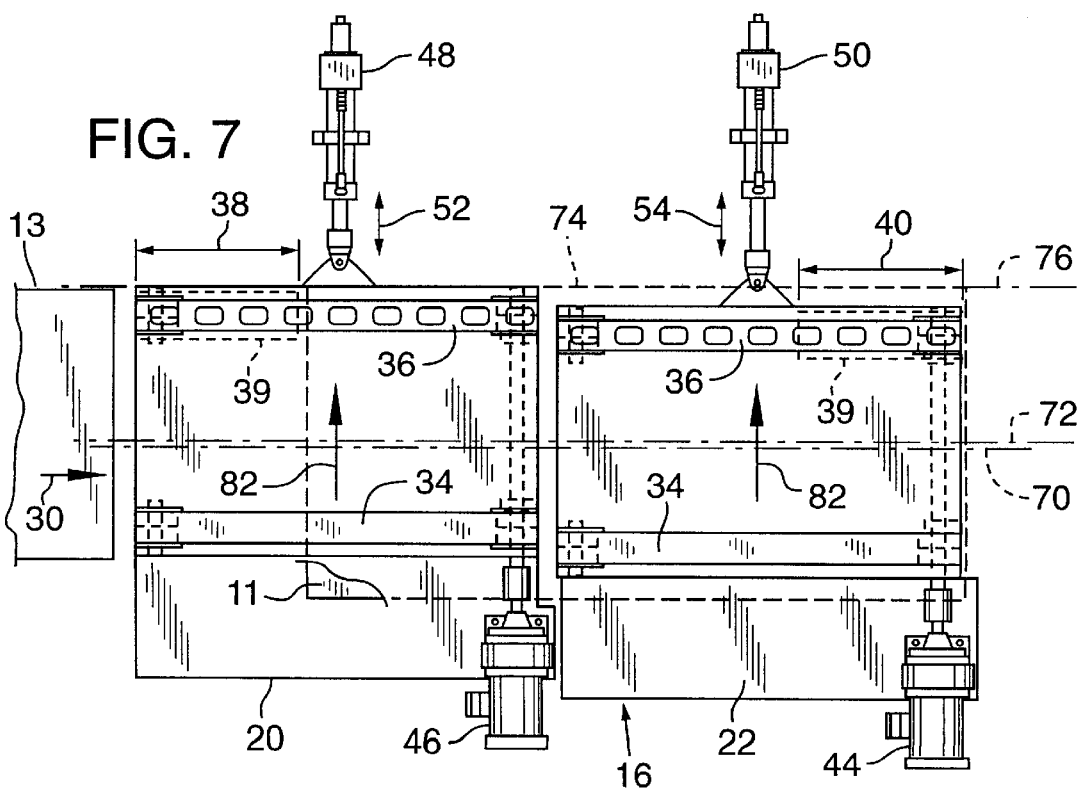

POSITION ADJUSTMENT CONVEYOR

FIELD OF THE INVENTION

This invention relates to a conveyor that provides skew and side shifting adjustment of sheets conveyed on a conveyor.

BACKGROUND OF THE INVENTION

Veneer sheets are used to produce laminated veneer lumber such as plywood. A thin layer of wood veneer is peeled from a log, cut into sheets, arranged in stacks of, e.g., three or more sheets, and glued together to produce continuous laminations varying in length and thickness depending on the thickness of the sheets and the number of sheets in the construction.

Stacking and gluing of the veneer sheets to produce laminated veneer lumber is largely accomplished by automated pressing machinery. As contemplated herein obtaining ideal efficiency of the automated pressing machinery depends on continuous feeding of the sheets and that such sheets be fed (conveyed) to the machinery in a precise or near precise skew and side position orientation.

The present invention is directed to achieving a final skew adjustment and positioning of sheets to place them in the desired orientation for automatic stacking by the pressing machinery but without interrupting the feed rate of the sheets.

BRIEF DESCRIPTION OF THE INVENTION

In a preferred embodiment, a conventional conveyor for veneer sheets feeds the sheets onto a position adjusting conveyor including a pair of independent conveyor sections or carriages arranged in sequence. The adjusting conveyor carries the sheets onto a further conveyor or into the automatic pressing machinery. The combined length of the two carriages is at least as long as a sheet of veneer plus the distance traveled during the positioning process. Each carriage has a pair of side belts engaging and conveying a sheet in the direction of conveyance. Each section is an independent unit and includes a drive motor, belt pulleys and side mounted belts. Each carriage includes a plenum in which negative air pressure is created. An opening of about two feet in length is provided along the top of the plenum under one of the belts of each pair of belts which belt is provided with openings or perforations. The plenum openings are provided at the front end of the first carriage and the rear end of the second carriage. Additionally, each carriage in its entirety is mounted for lateral sliding movement by actuators controlled by a computer.

As the perforated belt travels over the plenum opening, air is drawn into the plenum and through the belt perforations to draw the veneer sheet against the belt. Thus, the sheet is secured to the belt at the position of the plenum opening, i.e., the front end of the first carriage and the rear end of the following carriage. Each sheet is scanned as it enters the conveyor sections and a desired skew and side shifting adjustment is calculated for that sheet by the computer. At the point where the sheet extends along both carriages so that a small area at both ends of the sheet is effectively secured by vacuum pressure to the perforated belt traveling over the plenum opening, the computer directs shifting of the carriages. The areas of the veneer sheet overlying the plenum openings functions as pivot points (albeit a moving pivot point) and the proper side shifting of the carriages produces both skew correction and side shifting alignment as desired for feeding the sheets to the automatic pressing machine.

Whereas the two foot opening in each plenum does not specifically define the pivot point as such, considering the center of the opening as the pivot axis and making the corrections accordingly produces acceptably close adjustments, if not truly exact adjustments, of the sheets.

The invention will be more fully understood and appreciated upon reference to the following detailed description having reference to the accompanying drawings.

BRIEF DESCRIPTION OF THE DRAWINGS

FIG. 6 illustrates one carriage of the position adjustment conveyor moving to rotate the veneer sheet on the position adjustment conveyor; and FIG. 7 illustrates both carriages of the position adjustment conveyor moving to align an edge of the veneer sheet with a datum line.

DESCRIPTION OF THE PREFERRED EMBODIMENT

Figure 1:
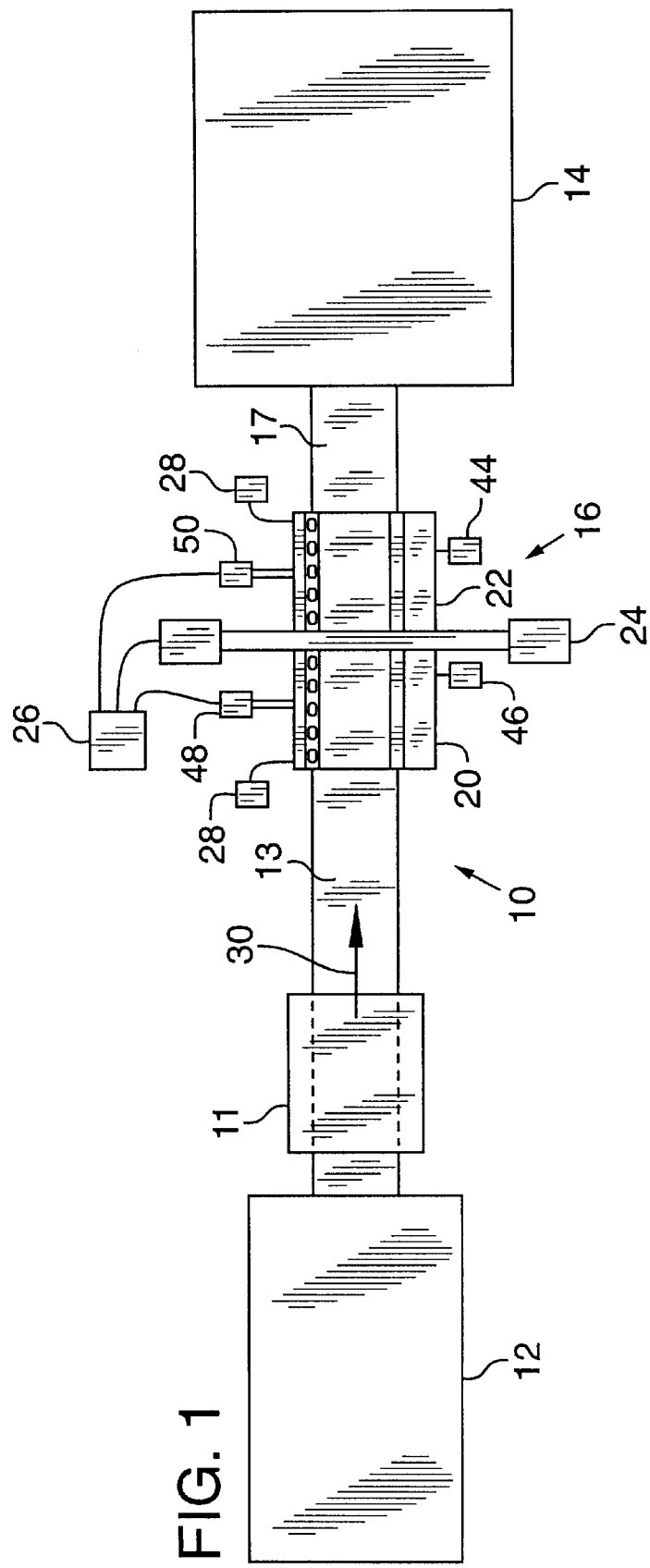
FIG. 1 is a view in diagram form of a conveyor system that incorporates a position adjustment conveyor of the present invention.

FIG. 1 illustrates a conveyor system 10 for conveying veneer sheets 11 from an inventory source 12 to a laminating press 14. The conveyor system 10 includes a position adjustment conveyor 16 that is arranged to adjust the position of the veneer sheet 11 on the conveyor system 10 so that the sheet 11 is delivered to the press 14 in a desired attitude and position. The position adjustment conveyor 16 will rotate (pivot) and laterally shift the veneer sheet 11 as required to properly deliver the sheet to the press 14. The position adjustment conveyor 16 has independent carriages (sections) 20 and 22 that are positioned adjacent to each other and are independently movable. A scanner 24 is provided to scan the veneer sheet as it enters the position adjustment conveyor 16. The scan data is input to a computer and the computer will determine the skew and offset of the veneer sheet. The computer 26 will control movement of the carriages 20, 22 as required to adjust the position of the veneer sheet 11. A vacuum system 28 supplies negative air pressure to a portion of each of the carriages 20, 22 which will later be explained.

The inventory source 12 typically has stacks of sheets 11 that are sequentially placed on the first conveyor 13 and are transported toward the laminating press equipment 14 as indicated by arrow 30. The sheets 11 are transported in sequence on the first conveyor 13 and may not be properly aligned with the press 14. The sheet 11 as it is delivered onto the positioning adjustment conveyor 16 will, if required, be adjusted for skew and offset by the carriages 20, 22.

The scan data input from the scanner 24 to the computer 26 will establish the offset and the skew orientation of the sheet 11 on the conveyor system 10 as it progresses onto the position adjusting conveyor 16. The computer utilizes the scan data to control the movement of the carriages 20, 22 to effect the pivoting and side shifting of the veneer sheet 11 on the position adjusting conveyor 16.

Figure 2:
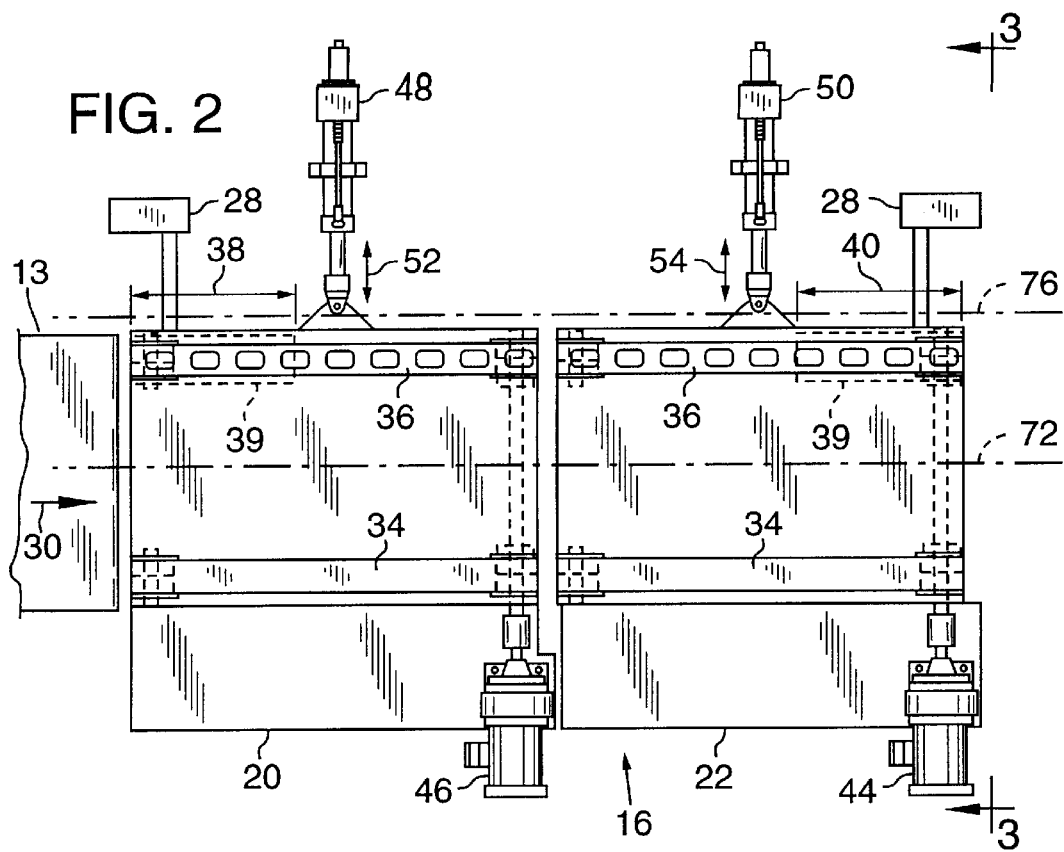
FIG. 2 is a top plan view of the position adjustment conveyor of FIG. 1.
Figure 3:
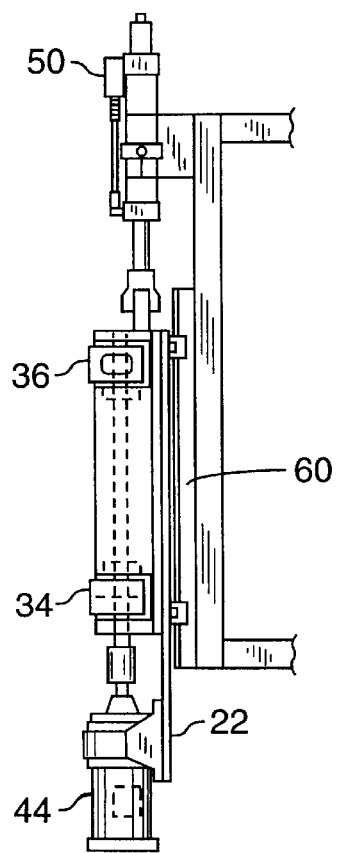
FIG. 3 is a view as viewed on view lines 3—3 of FIG. 2 of the position adjustment conveyor.

The position adjustment conveyor 16 is further illustrated in FIGS. 2 and 3. The position adjustment conveyor 16, as previously mentioned, has two independently movable carriages 20, 22. The carriages 20, 22 are of the belt type and each has a belt 34 on one side of the carriage and a perforated belt 36 on the opposite side of the carriage. The belts 36 of the carriages 20, 22 are of the perforated type which allows air to pass there through. A known vacuum system 28 provides a vacuum zone for each of the carriages 20, 22 with the vacuum zone of carriage 20 being indicated by arrow 38 and the vacuum zone of the carriage 22 being indicated by arrow 40. The vacuum zone 38 is essentially at the leading edge of the carriage 20 and the vacuum zone 40 is essentially at the trailing edge of the carriage 22. A plenum 39 is mounted beneath the belt 36 at each of the vacuum zones 38, 40 of the carriages 20, 22. Each plenum 39 is connected to the vacuum system 28. The vacuum system 28 is not detailed since such vacuum systems are known in the industry. The vacuum system 28 will withdraw air through the belts 36 in the zones 38, 40 and a veneer sheet 11 in contact with the belt 36 within the zones 38, 40 will be forced downward against the belt 36 due to the differential air pressure.

The carriages 20, 22 each have a separate drive motor for driving the belts 34, 36 in unison. Further, the belts 34, 36 of carriage 20 are driven at the same rate as the belts 34, 36 of carriage 22. Carriage 22 has a master drive motor 44 and the carriage 20 has a slave drive motor 46 that is coupled to the master drive motor 44 in a conventional manner. The carriages 20, 22 are movable transverse to the feed path (indicated by arrow 30) of the conveyor system 10 as indicated by arrows 52, 54. A servo-cylinder (actuator) 48 is coupled to the carriage 20 and a servo-cylinder (actuator) 50 is coupled to the carriage 22. The servo-cylinders 48, 50 are controlled by the computer 26 to move the carriages 20, 22 in either direction as indicated by directional arrows 52, 54. The carriages 20, 22 are independently movable in each direction and are further movable in unison.

The carriages 20, 22 are mounted on guide ways 60 as best seen in FIG. 3. In this embodiment, the guide ways are ball bearing rails which provide minimum resistance to motion which facilitates the rapid and accurate positioning of each of the carriages 20, 22 by their respective servo-cylinders 48, 50.

Figure 4:
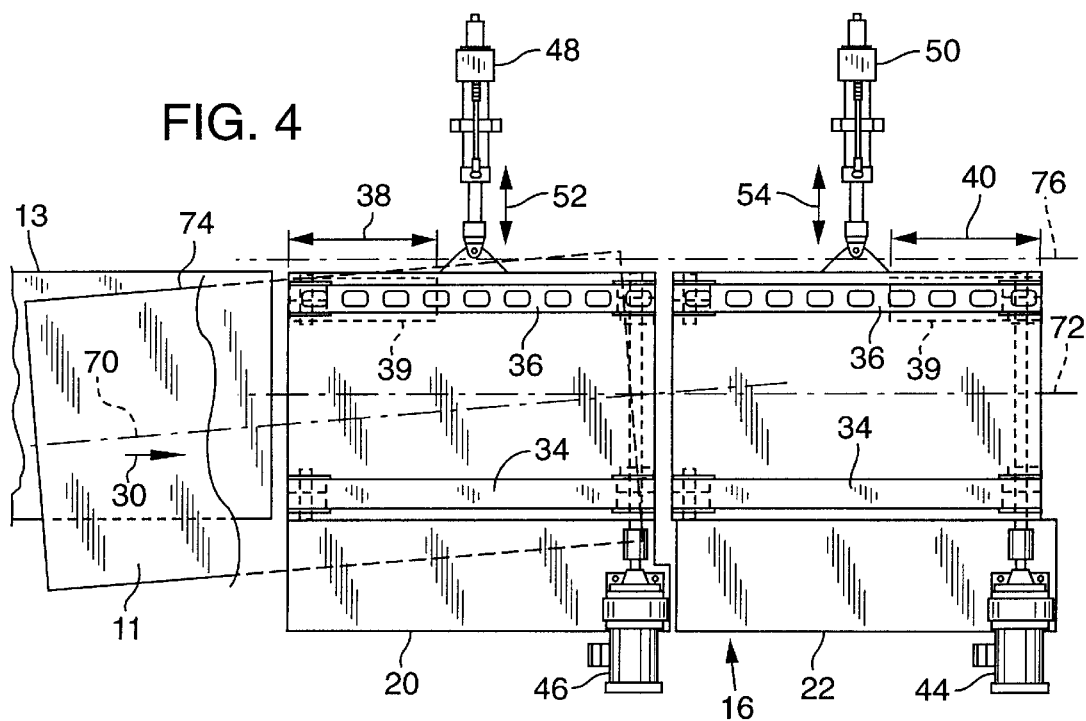
FIG. 4 illustrates a veneer sheet traveling onto the position adjustment conveyor.

Refer now to FIG. 4 of the drawings which illustrates a veneer sheet 11 being conveyed on the first conveyor 13 and being transferred to the position adjusting conveyor 16. Typically the sheet 11 when placed on the first conveyor 13 is not in proper alignment and thus may be skewed and/or offset. As shown in FIG. 4, the sheet 11 is skewed such that the longitudinal axis 70 of the veneer sheet 11 is not parallel to the center line 72 of the conveyor system 10 and in particular the press 14. Further, an edge 74 of the sheet 11 is not aligned with the zero line 76 of the press 14.

The carriages 20, 22 of the position adjusting conveyor 16 are arranged to reposition the sheet 11 such that the longitudinal axis 70 of the sheet 11 will be parallel to the center line 72 of the press 14 and further that an edge 74 of the sheet 11 will be in alignment with the zero line 76 of the press 14.

FIG. 4 illustrates a sheet 11 just progressing onto the carriage 20 of the position adjusting conveyor 16. The belts 34, 36 of the carriages 20, 22 are driven at a rate such that the sheet 11 will maintain its rate of travel without alteration as the sheet progresses from the first conveyor 13 onto the position adjusting conveyor 16 and into the press 14. The belts 34, 36 of the carriages 20, 22 frictionally engage the sheet 11 to propel the sheet 11.

Figure 5:
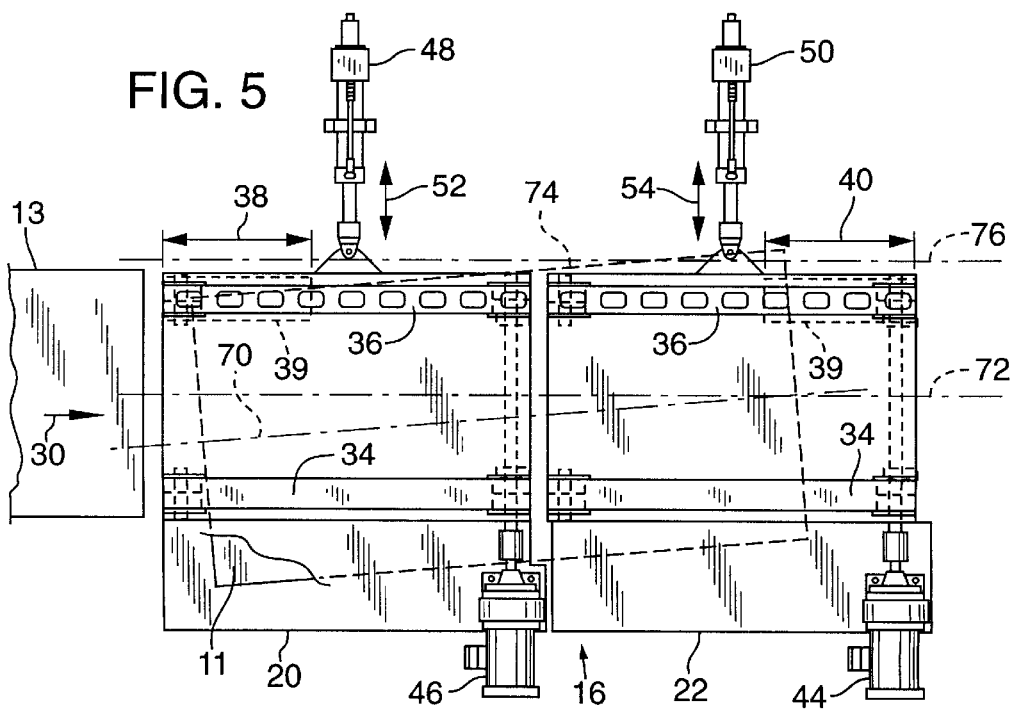
FIG. 5 illustrates the veneer sheet moved into position on the position adjustment conveyor whereat the position and rotation of the veneer sheet may be accomplished.

FIG. 5 illustrates a sheet 11 progressing further on the position adjusting conveyor 16 and is advancing to a position where the carriages 20, 22 will both pivot the sheet 11 such that the center line 70 of the sheet 11 will be parallel to the center line 72 of the press 14 and will further move the sheet 11 in either direction as required to align the edge 74 with the zero line 76 of the press 14. As shown in FIG. 5, the sheet 11 has progressed on the position adjusting conveyor 16 such that a portion of the sheet 11 on the belt 36 is within the vacuum zones 38, 40 of the carriages 20, 22. The vacuum system 28 is arranged to withdraw air through the perforations of the belts 36 and thus the sheet 11 will be forced against the belt 36 due to the differential air pressure. The frictional engaging force between the sheet 11 and the belt 36 in the zones 38, 40 is greater than that of the engaging force between the sheet 11 and the belt 36 outside of the vacuum zones 38, 40 and that between the sheet 11 and the belt 34.

The sheet 11 is thus essentially gripped at two points with one of the points being the belt 36 in the vacuum zone 38 of carriage 20 and the other point being the belt 36 in the vacuum zone 40 on carriage 22. Two gripping points thus determine a pivotal axis about which the sheet 11 may be rotated or pivoted to align the longitudinal axis 70 in a parallel attitude with the center line 72 of the press 14. It will be appreciated that the gripping points established on the sheet 11 by the vacuum zones 38, 40 will vary depending on the position of the sheet 11 on the position adjusting conveyor 16. In any event, two points are essentially established on the sheet 11 and thus the sheet 11 may be pivoted by movement of one or both of the carriages 20, 22.

FIG. 6 illustrates the carriage 22 being moved in the direction as indicated by arrow 80 to thus pivot the sheet 11 on the carriages 20, 22 to align the longitudinal axis 70 of the sheet 11 in a parallel attitude with the center line 72 of the press 14. The pivotal motion of the sheet 11 is accomplished without altering the rate of travel of the sheet 11 on the conveyor system. As shown in FIG. 6, the sheet 11 has been moved to have its longitudinal axis parallel to the center line of the press 14. However, the edge 74 of the sheet 11 is not in alignment with the zero line 76 of the press 14.

FIG. 7 illustrates the carriages 20, 22 being moved in the direction as indicated by arrows 82 to align the edge 74 of the sheet 11 with the zero line 76 of the press 14.

The repositioning of the sheet 11 on the position adjusting conveyor 16 has been illustrated as a stepped process in FIGS. 4, 5, 6 and 7. However, it will be appreciated that the coordinated movement of the carriages 20, 22 are moved directly to their end positions as shown in FIG. 7 from the initial positions as shown in FIGS. 4 and 5 to accomplish both the pivoting and the side shifting of the veneer sheet 11 to accurately position the sheet for the press 14.

The sheet 11 is then fed directly into the press 14 or is transferred onto an infeed conveyor 17 which feeds the sheet 11 into the press 14.

Those skilled in the art will recognize that modifications and variations may be made without departing from the true spirit and scope of the invention. The invention is therefore not to be limited to the embodiments described and illustrated but is to be determined from the appended claims.

We claim:

1. A conveyor system having adjustment features enabling skew and side shifting of a sheet of material while being conveyed; said conveyor comprising:

first and second sequentially adjacent conveyor sections provided in the path of a feed conveyor and sequentially receiving elongated sheets, said first and second conveyor sections cooperatively arranged to receive and manipulate a selected sheet of material independent of other sheets of material fore and aft of said selected sheet of material being conveyed;

a gripping feature provided on each conveyor section for cooperatively gripping the selected sheet at spaced apart positions of the sheet;

a shift mechanism for each conveyor section for independent side shifting of the conveyor sections, and thereby the position of said gripping features; and a scanner for scanning elongated sheets and determining thereby the position of the sheet on the conveyor and a controller determining the desired manipulation of each sheet to achieve the desired orientation of each sheet, said side shifting mechanism of the conveyor sections responsive to the controller for desired skew and side shifting of the sheets.

2. A conveyor system as defined in claim 1, wherein:

the gripping feature is a vacuum system drawing air through a portion of the conveyor section in the path of the sheets being conveyed.

3. A conveyor system as defined in claim 2, wherein:

the first and second conveyor sections are belt type conveyors each having at least one perforated belt directed over the portion whereat air is drawn to secure the sheet to the perforated belt.

4. A conveyor system as defined in claim 3, wherein:

the gripping feature is applied to the leading edge of the first conveyor section and to the trailing edge of the second conveyor section to provide spaced apart gripping points on the sheet.

5. A conveyor system as defined in claim 4, wherein:

each conveyor section is an independent carriage having a plenum, a perforated conveyor belt entrained on the carriage and passing over the plenum, and a drive motor driving the belt, all of said components shifted as a unit by said shift mechanism.

* * * * *

UNITED STATES PATENT AND TRADEMARK OFFICE
CERTIFICATE OF CORRECTION

PATENT : 5,984,301

DATED : November 16, 1999

INVENTOR(S) : John C. Holbert, et al.

It is certified that error appears in the above-identified patent and that said Letters Patent is hereby corrected as shown below:

On the title page, item [73] should read:

--[73] Assignee: Corvallis Tool Co., Philomath, Oreg.--.

Signed and Sealed this

Fourteenth Day of March, 2000

Attest:

Q. TODD DICKINSON

*Attesting Officer*  *Commissioner of Patents and Trademarks*